(12) United States Patent
Cook

(10) Patent No.: US 6,989,537 B2
(45) Date of Patent: Jan. 24, 2006

(54) COMPACT INVERSE-TELEPHOTO INFRARED IMAGING OPTICAL SYSTEM

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 24 days.

(21) Appl. No.: 10/715,678

(22) Filed: Nov. 18, 2003

(65) Prior Publication Data

US 2005/0103999 A1 May 19, 2005

(51) Int. Cl.
*G01J 5/02* (2006.01)
(52) U.S. Cl. .................................................. 250/353
(58) Field of Classification Search ............... 250/353; 359/357
See application file for complete search history.

(56) References Cited

U.S. PATENT DOCUMENTS

| 4,299,452 | A | * | 11/1981 | Ikemori ........................ 359/681 |
| 4,600,265 | A | * | 7/1986 | Norrie .......................... 359/351 |
| 4,679,891 | A | | 7/1987 | Roberts et al. |
| 5,446,581 | A | | 8/1995 | Jamieson |
| 5,502,592 | A | | 3/1996 | Jamieson et al. |
| 6,424,460 | B1 | * | 7/2002 | Kirkham ...................... 359/353 |

FOREIGN PATENT DOCUMENTS

| JP | 07318797 | 12/1995 |
| JP | 11023962 | 1/1999 |
| JP | 2002196233 | 7/2002 |

* cited by examiner

*Primary Examiner*—David Porta
*Assistant Examiner*—Marcus Taningco
(74) *Attorney, Agent, or Firm*—John E. Gunther; Leonard A. Alkov; William C. Schubert

(57) ABSTRACT

An infrared imaging optical system includes a front lens group having negative optical power, wherein the front lens group comprises a front lens having a refractive index of from about 2.0 to about 3.0; an intermediate lens group that receives an infrared light beam from the front lens group, wherein the intermediate lens group comprises an intermediate lens having a refractive index of from about 1.35 to about 2.0; and a rear lens group having positive optical power, wherein the rear lens group receives the infrared light beam from the intermediate lens group, wherein the rear lens group comprises a rear lens having a refractive index of from about 2.0 to about 3.0, and wherein at least two of the front lens, the intermediate lens, and the rear lens have at least one aspheric surface thereon. The infrared imaging optical system further includes an infrared detector that receives the infrared light beam from the rear lens group. There is a pupil located between the rear lens group and the detector. There preferably is a cold shield around the detector having an opening therein at the pupil.

21 Claims, 4 Drawing Sheets

FIG. 4A

| SURF NO. | DESCRIPTION | RADIUS | THICKNESS | MATERIAL | CC |
|---|---|---|---|---|---|
| 1 | IMAGE SURF | INF. | 13.281 | AIR | |
| 2 | STOP | INF. | 0.195 | AIR | |
| 3 | WINDOW | INF. | 0.391 | Si | |
| 4 | | INF | 0.997 | AIR | |
| 5 ⎤ 5A | | 30.241 | 4.500 | AMTIR 1 | -0.78478 |
| 6 ⎦ | | -52.383 | 2.499 | AIR | |
| 7 ⎤ 50b | | -15.476 | 2.003 | MgO | |
| 8 ⎦ | | -18.517 | 4.337 | AIR | |
| 9 ⎤ 50a | | 102.515 | 2.139 | Ge | |
| 10 ⎦ | | 206.705 | 28.283 | AIR | |
| 11 ⎤ 46 | | 14.399 | 1.499 | ZnSe | 0.118099 |
| 12 ⎦ | | -31.192 | | AIR | |

STOP DIAMETER IS 13.281
IMAGE DIAMETER IS 12.565
OPERATIONAL WAVELENGTH 3.5 TO 5.0 MICRONS

FIG. 4B

| SURF NO. | A | B | C | D | E | F |
|---|---|---|---|---|---|---|
| 1 | | | | | | |
| 2 | | | | | | |
| 3 | | | | | | |
| 4 | | | | | | |
| 5 ⎤ 54 | $-5.246 \times 10^{-6}$ | $1.337 \times 10^{-8}$ | $4.495 \times 10^{-10}$ | $-3.764 \times 10^{-12}$ | $-3.202 \times 10^{-14}$ | $3.538 \times 10^{-16}$ |
| 6 ⎦ | | | | | | |
| 7 ⎤ 50b | $-1.647 \times 10^{-5}$ | $-8.867 \times 10^{-8}$ | $6.047 \times 10^{-10}$ | $-4.213 \times 10^{-12}$ | $-2.021 \times 10^{-14}$ | $2.813 \times 10^{-16}$ |
| 8 ⎦ | | | | | | |
| 9 ⎤ 50a | $2.702 \times 10^{-5}$ | $-1.010 \times 10^{-8}$ | $1.919 \times 10^{-9}$ | $-1.564 \times 10^{-12}$ | $-1.165 \times 10^{-13}$ | $1.219 \times 10^{-15}$ |
| 10 ⎦ | | | | | | |
| 11 ⎤ 46 | $-3.192 \times 10^{-6}$ | $1.200 \times 10^{-7}$ | $-2.641 \times 10^{-9}$ | $3.632 \times 10^{-11}$ | $-2.406 \times 10^{-13}$ | $6.446 \times 10^{-16}$ |
| 12 ⎦ | | | | | | |

COMPACT INVERSE-TELEPHOTO INFRARED IMAGING OPTICAL SYSTEM

This invention relates to an infrared imaging optical system and, more particularly, to an inverse-telephoto infrared optical system that is highly compact.

BACKGROUND OF THE INVENTION

Infrared imaging optical systems are typically used to view and image light energy in the infrared optical spectrum of from about 2 to about 7 micrometers wavelength, and more particularly from about 3 to about 5 micrometers wavelength. The production of infrared light is associated in many cases with the evolution of heat by hot objects such as engines or by the human body, and for that reason infrared light is widely used to detect such hot objects. Infrared energy is transmitted through many conditions which block visible light, such as clouds of particulate matter or water vapor.

Missiles fired at an aircraft may be detected by the heat and corresponding infrared signatures produced by their engines, regardless of whether the missile is guided by an active or passive targeting system. Aircraft that are potentially targets for such infrared-guided missiles may carry infrared-warning devices that view the exterior world in search of heat signatures that are associated with the engines of the missiles. A warning signal is provided to the aircraft crew upon detection of such a signature.

In one type of infrared-warning device, fixed infrared warning sensors are positioned at locations on the target aircraft. Side-facing, top-facing, bottom-facing, forward-facing, and aft-facing sensors may be used. The sensors include an array of lenses that focus the external infrared energy onto a cryogenically cooled detector. The detector converts the incident infrared energy to electrical signals, which are analyzed for infrared signatures that may be associated with threats to the aircraft such as fired missiles.

The infrared-warning sensors may use an inverse-telephoto lens system, sometimes termed a "fisheye" lens, because it allows the field of view to be very large. Some associated distortion of the image is accepted, because the function of the infrared-warning sensor is not to precisely image the infrared signature, but instead to identify its presence and approximate location relative to the aircraft.

Inverse-telephoto optical systems are widely available for the visible spectrum. For infrared optical systems, however, many fewer types of inverse-telephoto optical systems are available, because the infrared detector must be cryogenically cooled. The lenses of the optical system are preferably not cooled, because a very large, high-capacity cryostat would be required and because the cooling from room temperature to the cryogenic operating temperature would alter the positions of the lenses due to thermal expansion. The inverse-telephoto lens array must therefore have an external pupil for the location of a cold shield that surrounds only the cryogenically cooled detector and not the lenses.

Only a very few inverse-telephoto optical systems, such as that described in U.S. Pat. No. 5,446,581, have an external pupil. These known external-pupil inverse-telephoto optical systems have a long ratio of their physical length to their focal length, typically on the order of 20:1 to 30:1. These very long lens systems result in a large weight and size for the infrared sensor, as well as require large-diameter lenses that are relatively expensive to manufacture. It is difficult to package the long infrared sensor for many locations where it would otherwise be desirable to position the sensor, such as at the top of the tail of the aircraft.

There is a need for an improved inverse-telephoto optical system for infrared applications which has an external pupil, and in which the wide field of view and fast optical speed are retained, but in which the optical system has a physical length that is much shorter than is now available. The present invention fulfills this need, and further provides related advantages.

SUMMARY OF THE INVENTION

The present invention provides a compact inverse-telephoto infrared imaging optical system having a wide field of view, fast optical speed, and small ratio of the physical length to the focal length. The ratio of the physical length to the focal length is typically on the order of 8:1 to 10:1, compared to 20:1 to 30:1 for prior inverse-telephoto infrared imaging optical systems. The present inverse-telephoto infrared imaging optical system is therefore much smaller and lighter than the prior inverse-telephoto infrared imaging optical systems. Additionally, the image quality and distortion in optical systems of the present approach are significantly better than available in prior approaches.

In accordance with one embodiment of the invention, an infrared imaging optical system comprises a front lens group having negative optical power, wherein the front lens group comprises a front lens made of an infrared-transparent material having a refractive index of from about 2.0 to about 3.0, more preferably from about 2.2 to about 2.6. An intermediate lens group receives an infrared light beam from the front lens group. The intermediate lens group preferably comprises two intermediate lenses, one intermediate lens made of an infrared-transparent material having a refractive index of from about 1.35 to about 2.0, more preferably from about 1.35 to about 1.7, and another intermediate lens made of an infrared-transparent material having a refractive index of greater than about 3.0. A rear lens group has positive optical power and receives the infrared light beam from the intermediate lens group. The rear lens group comprises a rear lens made of an infrared-transparent material having a refractive index of from about 2.0 to about 3.0, more preferably from about 2.2 to about 2.6. It is preferred that at least two of the front lens, the intermediate lens, and the rear lens have at least one aspheric surface thereon. An infrared detector, preferably operating in the 2–7 micrometer wavelength range, and more preferably operating in the 3–5 micrometer wavelength range, receives the infrared light beam from the rear lens group. There is an external pupil located between the rear lens group and the detector. In most cases, there is a cold shield around the detector and having its opening at the pupil and an entrance window near the pupil.

The lenses with a refractive index of from about 2.0 to about 3.0 are preferably made of an infrared-transparent material selected from the group consisting of zinc sulfide, zinc selenide, arsenic trisulfide, and amtir1. The lenses with a refractive index of from about 1.35 to about 2.0 are preferably made of an infrared-transparent material selected from the group consisting of sapphire, spinel, barium fluoride, calcium fluoride, magnesium fluoride, and magnesium oxide. The lenses with a refractive index of greater than about 3.0 are preferably made of germanium, silicon, or gallium arsenide.

In another embodiment, an infrared imaging optical system comprises a front lens group having negative optical power and including a front lens, an intermediate lens group that receives an infrared light beam from the front lens group and includes an intermediate lens, and a rear lens group having positive optical power and that receives the infrared light beam from the intermediate lens group. The rear lens group comprises a rear lens. At least two of the front lens, the intermediate lens, and the rear lens have at least one aspheric surface thereon. The optical system further includes an infrared detector that receives the infrared light beam from the rear lens group, and a pupil located between the rear lens group and the detector. The front lens preferably has a refractive index of from about 2.0 to about 3.0, more preferably from about 2.2 to about 2.6. One intermediate lens preferably has a refractive index of from about 1.35 to about 2.0, more preferably from about 1.35 to about 1.7. The rear lens preferably has a refractive index of from about 2.0 to about 3.0, more preferably from about 2.2 to about 2.6. Other consistent and operable features discussed herein may be used with this embodiment as well.

Most preferably, the features of these two embodiments are combined in a third-most preferred embodiment. An infrared imaging optical system comprises a front lens group having negative optical power, wherein the front lens group comprises a front lens having a refractive index of from about 2.0 to about 3.0, more preferably from about 2.2 to about 2.6. There is an intermediate lens group that receives an infrared light beam from the front lens group, wherein the intermediate lens group comprises an intermediate lens having a refractive index of from about 1.35 to about 2.0, more preferably from about 1.35 to about 1.7. A rear lens group has positive optical power and receives the infrared light beam from the intermediate lens group. The rear lens group comprises a rear lens having a refractive index of from about 2.0 to about 3.0, more preferably from about 2.2 to about 2.6. At least two of the front lens, the intermediate lens, and the rear lens have at least one aspheric surface thereon. An infrared detector receives the infrared light beam from the rear lens group. There is a pupil located between the rear lens group and the detector. In most cases, there is a cold shield around the detector with the opening of the cold shield at the pupil and with an entrance window near the pupil. Other consistent and operable features discussed herein may be used with this embodiment as well.

The embodiments of the present approach all have an external pupil between the rear lens group and the infrared detector. (An "external pupil" is a pupil that is not between the first and last lenses of the lens group of the optical system.) The external pupil allows the lenses to be used with a compact cold-shield positioned around the detector only but not around any of the lenses. The window of the cold shield is placed axially at a location near to that of the pupil. As noted, the present lens array is about ½ to ⅓ the length of prior inverse-telephoto infrared imaging optical systems, an important advantage where the application requires small size and low weight.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is an optical prescription for an embodiment of the present approach.

DETAILED DESCRIPTION OF THE INVENTION

Figure 1:
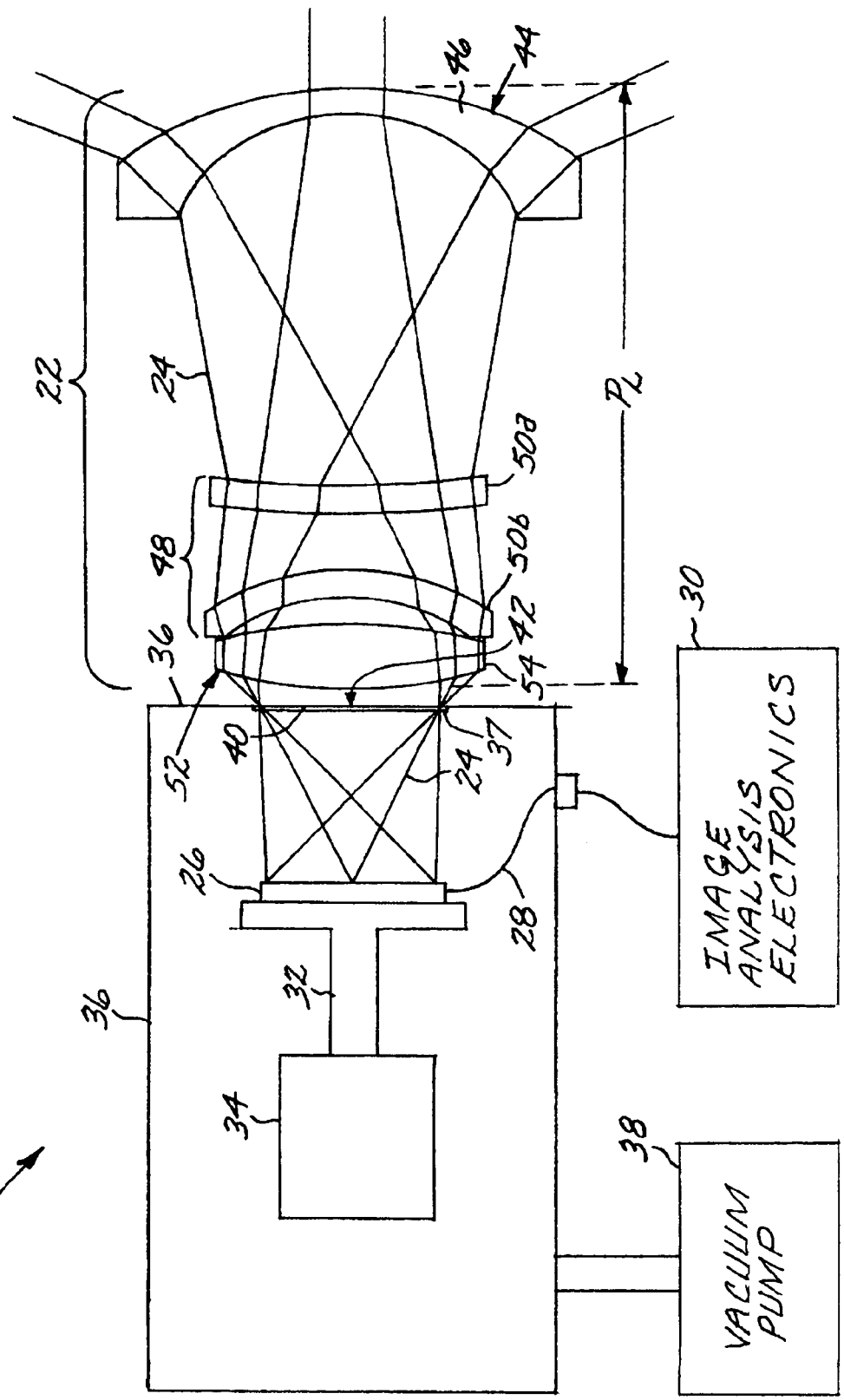
FIG. 1 is a schematic depiction of an infrared imaging optical system according to the present approach.

FIG. 1 depicts an infrared imaging optical system 20. The infrared imaging optical system 20 includes a lens group 22 that focuses an infrared light beam 24 from a scene onto an infrared detector 26. The infrared detector 26 is preferably a focal plane array (FPA) located at the focal plane of the lens group 22. The infrared detector 26 may be selected to be sensitive to any infrared wavelength or range of wavelengths. Preferably, it is sensitive to infrared wavelengths of from about 2 to about 7 micrometers wavelength, and more preferably the mid wavelength infrared range of from about 3 to about 5 micrometers wavelength. Infrared detectors 26 of these types and their manufacture are known in the art. The infrared detector 26 converts the incident infrared light beam 24 to an output signal 28, which is analyzed by image analysis electronics 30. Such image analysis electronics 30 is known in the art.

The preferred infrared detector 24 operates most effectively and efficiently at cryogenic temperatures of about 77K. The infrared detector 26 is mounted to one end of a pedestal 32, and the other end of the pedestal 32 is mounted to a cryostat 34, such as a Joule-Thomson cryostat, to cool the infrared detector 26 to such a low temperature by conduction of heat through the pedestal 32. The infrared detector 26, the pedestal 32, and the cryostat 34 are enclosed in a vacuum dewar, which serves as a cold shield 36. The cold shield 36 is vacuum tight, and is evacuated by a vacuum pump 38. An opening 37 of the cold shield 36 is located at, and a window 40 of the cold shield 36 is located near (i.e., typically within 3 millimeters), an external pupil 42 of the lens group 22. For such an infrared imaging optical system 20 that uses a cold shield 36, it is necessary that the pupil 42 of the lens group 22 be external to the lens group 22. Stated alternatively, the pupil 42 must lie between the lens group 22 and the infrared detector 26. It cannot lie within the lens group 22, or the cold shield 36 would have to include at least one of the lenses of the lens group 22. The opening 37 (the "cold stop") of the cold shield 36 is at the external optics pupil 42. Otherwise, the detector 26 will detect energy from the lens surfaces and/or from some other component, such as a housing of the lens group 22, that is warm and is of high emissivity. The result is that the background signal reaching the detector 26 will greatly increase.

The lens group 22 of the infrared imaging optical system 20 includes a front lens group 44 having negative optical power. The front lens group 44 has a front lens 46 with a refractive index of from about 2.0 to about 3.0, more preferably from about 2.2 to about 2.6. The infrared light beam 24 from the scene is incident upon the front lens group 44.

The lens group 22 further includes an intermediate lens group 48 that receives the infrared light beam 24 from the front lens group 44. In the illustrated case, the intermediate lens group 44 includes two intermediate lenses 50, indicated as lenses 50a (which is closer to the front lens 46) and 50b (which is further from the front lens 46). The intermediate lens 50a is preferably made of an infrared-transparent material having a relatively high index of refraction of greater than about 3.0. The intermediate lens 50b is preferably made of an infrared-transparent material having a refractive index of from about 1.35 to about 2.0, more preferably from about 1.35 to about 1.7.

The lens group 22 further includes a rear lens group 52 having positive optical power that receives the infrared light beam 24 from the intermediate lens group 48. The rear lens group 52 comprises a rear lens 54 having a refractive index of from about 2.0 to about 3.0, more preferably from about 2.2 to about 2.6.

Figure 2:
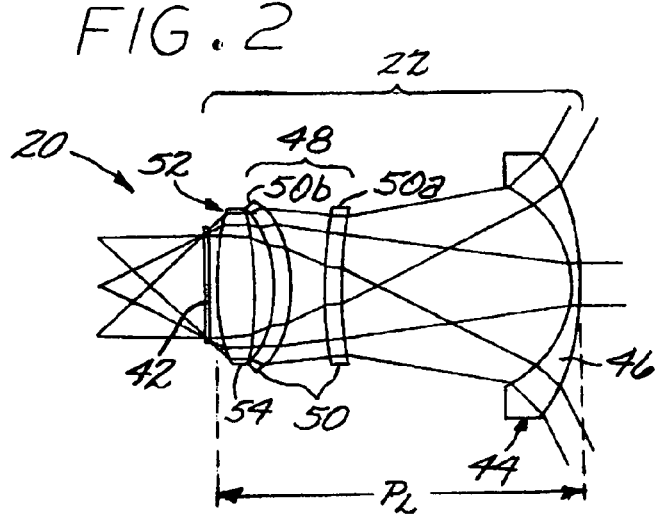
FIG. 2 is a schematic depiction of a portion of the infrared imaging optical system of FIG. 1.

The lens group 22 is an "inverse-telephoto" lens group. In such an inverse-telephoto lens group, the front lens 46 has a negative optical power, and the rear lens 54 has a positive optical power. This combination of optical powers allows the lens group 22 to function in the "fisheye" manner, with a very wide field of view in both the azimuth and elevation as depicted in FIGS. 1 and 2. There is some distortion of the image on the infrared detector 26, but that distortion is acceptable for the applications of interest, in return for the very wide field of view.

Preferably, at least two of the front lens 46, the intermediate lens 50, and the rear lens 54 have at least one aspheric surface thereon. In the preferred embodiment, the front lens 46, the intermediate lens 50a, the intermediate lens 50b, and the rear lens 54 are all relatively thin lenses that each have exactly one aspheric surface thereon. An aspheric surface is a surface that cannot be described by a spheric relation, and typically has higher-order terms.

As noted earlier, the pupil 42 is an "external pupil" that is located between the rear lens group 52 and the detector 26. This external pupil is necessary for the applications involving an evacuated cold shield 36.

The lenses with a refractive index of from about 2.0 to about 3.0, specifically the front lens 46 and the rear lens 54, are preferably made of an infrared-transparent material such as zinc sulfide, zinc selenide, arsenic trisulfide, or amtir1 (having a nominal composition of $Ge_{33}As_{12}Se_{55}$). The intermediate lens 50a having a relatively high index of refraction of greater than about 3.0 is preferably made of an infrared-transparent material such as germanium, silicon, or gallium arsenide. The intermediate lens 50b having a refractive index of from about 1.35 to about 2.0, is preferably made of an infrared-transparent material such as sapphire, spinel, barium fluoride, calcium fluoride, magnesium fluoride, or magnesium oxide.

These materials of construction of the lenses are all transparent to light in the infrared range. These materials have been used for infrared lenses previously, but not for the lenses of inverse-telephoto optical systems in the manner indicated to achieve the surprising and unexpected results obtained with the present approach. Traditional infrared lens materials used for lenses of inverse-telephoto optical systems, silicon and germanium, have indices of refraction well above 3.3, and are not operable for the lenses of the present approach, except for their use in the one intermediate lens 50a. Additionally, the lens materials of the present approach have superior optical performance over a broader range of the infrared spectrum than do silicon and germanium.

An exemplary specific design has been developed in accordance with one embodiment of the present approach, and the optical prescription is set forth in FIG. 4 herein. As used herein, an "aspheric" surface shape z is described mathematically by the relation $$z = ch^2/\{1+[1-(1+k)c^2h^2]^{1/2}\} + Ah^4 + Bh^6 + Ch^8 + Dh^{10} + Eh^{12} + Fh^{14} + \ldots$$

plus a continuing series of higher order terms of the form $(\text{constant})h^{2n}$ if and as appropriate. The value z is the sag of the surface parallel to the z-axis, $h^2 = x^2 + y_2$, x and y are Cartesian coordinates in a plane perpendicular to the z-axis, c is the curvature at the vertex of the surface, k is the conic coefficient, and A, B, C, D, E, and F are constants.

Figure 3:
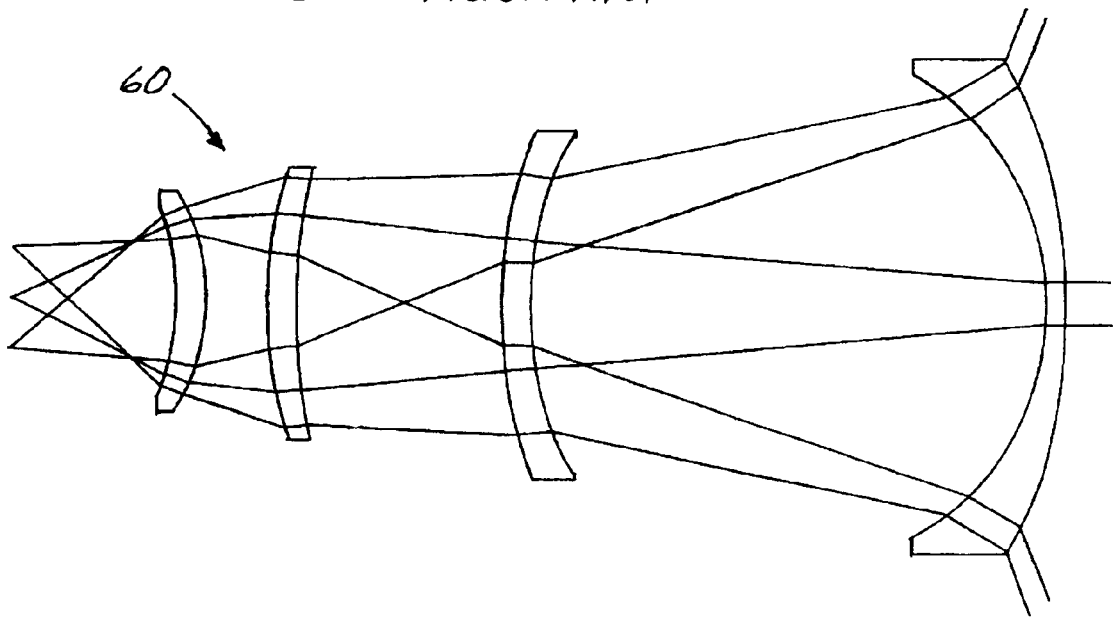
FIG. 3 is a schematic depiction of a portion of a prior art infrared imaging optical system, with the same focal length, aperture, and field of view as the portion of the infrared imaging optical system of FIG. 2, and in the same scale as FIG. 2.

This design of FIG. 4 herein has been compared with that set forth in Table 1 of U.S. Pat. No. 5,446,581, whose disclosure is incorporated by reference. This Table 1 embodiment of the '581 patent was chosen because it is the closest disclosed embodiment to that of the present approach. FIG. 2 illustrates the embodiment of the present approach, and FIG. 3 illustrates the embodiment 60 of the prior approach, see FIG. 1 of the '581 patent. In order to effect a fair comparison, the two designs are developed with the same focal length, aperture, f-number, and field of view.

The embodiments of FIGS. 2 and 3 respectively illustrate the present approach and the prior approach, and are drawn to scale relative to each other. The present approach of FIG. 4 herein produces a ratio of the physical length:focal length of about 10:1, while the prior art embodiment of Table 1 of the '581 patent has a ratio of the physical length:focal length of 21.5:1. (The physical length PL is the distance from the outwardly facing surface of the front lens to the inwardly facing surface of the rear lens.) The optical system of the present approach thus is much shorter in physical length than that of the prior approach.

As may be seen by comparing FIGS. 2 and 3, the diameters of the lenses in the present approach are smaller than those of the prior approach, and the length of the required support structure is smaller, leading to reduced weight for the present approach. The reduced weight and size are important advantages for some applications such as those in aircraft.

The reduced size and weight are achieved without a loss in optical performance, and in fact the optical performance of the present approach is superior to that of the embodiments of the '581 patent. To assess the image quality, the geometric polychromatic RMS blur diameter in milliradians (mrad) was evaluated. The present approach of FIG. 4 herein has a blur diameter of 1.9 mrad on-axis, 1.2 mrad at half-field, and 6.6 mrad at the field-of-view edge. The prior approach of Table 1 of the '581 patent has a blur diameter of 2.3 mrad on-axis, 2.6 mrad at half-field, and 9.0 mrad at the field-of-view edge. The image distortion was evaluated as a percentage departure from the fθ form. The departure of the approach of Table 1 of the '581 patent was 12 percent at the field-of-view edge, while the departure of the present approach of FIG. 4 herein was 6 percent at the field-of-view edge.

Generally, relative to the approach of the '581 patent and other prior approaches, the present approach presents improvements in three areas of an inverse telephoto lens for infrared applications:

(1) the physical size, as measured by the ratio of the physical length to the effective focal length (PL:EFL). The various embodiments of the '581 patent have a ratio PL:EFL in the range of 20:1 to 30:1, while the present approach has a ratio PL:EFL in the range of 8:1 to 10:1.

(2) image quality, as measured by the polychromatic geometrical RMS spot size S expressed in angular terms. The various embodiments of the '581 patent have a value of S of 1.7 to 3.5 on axis, and 5.8 to 10.8 off axis, while the present approach of FIG. 4 herein has a value of S of about 1.9 on axis and a maximum value of 6.6 off axis.

(3) distortion, as measured by the percent departure from the fθ relationship that is characteristic of inverse telephoto optical forms of this type. The embodiment of Table 1 of the '581 patent has a value of 12 percent at the field-of-view edge, while the present approach of FIG. 4 herein has a value of 6 percent at the field-of-view edge.

These advantages result primarily from the use of alternative optical materials for construction of the lenses, and from the selective use of higher-order aspheric surfaces for some of the lenses. The '581 patent uses the standard mid-wavelength infrared materials germanium and silicon for lens construction. These materials have high refractive indices of about 4.0 and 3.4, respectively. These materials limit the ability to correct field curvature and chromatic aberrations, important aberrations in the performance of very wide field of view inverse telephoto optical forms of this type. There are no other materials with refractive indices within about 0.1–0.2 of those of germanium and silicon. The dispersion of germanium is moderate and that of silicon is low. When these materials are used in the lenses, there are no material alternatives if the aberration correction dictates a slightly lower or higher refractive index for control of field curvature, or a slightly lower or higher dispersion for axial or lateral color correction.

By contrast, the present approach uses moderate-refractive-index materials such as zinc sulfide, zinc selenide, and amtir1, with refractive indices of about 2.25, 2.4, and 2.5 respectively, for the front lens 46 and the rear lens 54. Using these materials, the refractive index of the front lens 46 and/or the rear lens 54 may be raised or lowered slightly for correction of field curvature, because the refractive indices are near each other. Generally, the dispersions of these alternative materials are low for amtir1 and zinc selenide, and moderate for zinc sulfide. This allows a degree of chromatic aberration correction to be addressed at the same time as the field curvature is being corrected, by selecting the specific appropriate lens material.

The present approach also uses the lower refractive index crystalline materials such as sapphire, spinel, and magnesium oxide, with respective refractive indices of about 1.66, 1.63, and 1.66, in the intermediate lens 50*b* of the intermediate lens group to assist in the final balance of chromatic aberration correction and field curvature. These three materials have significantly higher dispersion characteristics than any of the other materials used in the front and rear lens groups. Lenses with a moderate to low amount of negative optical power made from these materials subtly affect both field curvature and chromatic aberration due to the low refractive index and high dispersion.

The present approach also allows the use of higher-order general aspheric surfaces in three important locations: near the external aperture stop nearest to the detector 26 for control of spherical aberration, near the center of the lens assembly for control of distortion, and on the large negative-power front lens for control of the field aberrations, coma, and astigmatism.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An infrared imaging optical system comprising:
a front lens group having negative optical power, wherein the front lens group comprises a front lens having a refractive index of from about 2.0 to about 3.0, and wherein the front lens is not made of silicon and is not made of germanium;
an intermediate lens group that receives an infrared light beam from the front lens group, wherein the intermediate lens group comprises an intermediate lens;
a rear lens group having positive optical power, wherein the rear lens group receives the infrared light beam from the intermediate lens group, and wherein the rear lens group comprises a rear lens having a refractive index of from about 2.0 to about 3.0; and
an infrared detector that receives the infrared light beam from the rear lens group, wherein
the imaging optical system has a pupil located between the rear lens group and the detector.

2. The infrared imaging optical system of claim 1, wherein at least two of the front lens, the intermediate lens, and the rear lens have at least one aspheric surface thereon.

3. The infrared imaging optical system of claim 1, wherein the lenses with a refractive index of from about 2.0 to about 3.0 are made of a material selected from the group consisting of zinc sulfide, zinc selenide, arsenic trisulfide, and amtir1.

4. The infrared imaging optical system of claim 1, wherein the intermediate lens group comprises an intermediate lens having a refractive index of from about 1.35 to about 2.0.

5. The infrared imaging optical system of claim 4, wherein the lens with a refractive index of from about 1.35 to about 2.0 is made of a material selected from the group consisting of sapphire, spinel, barium fluoride, calcium fluoride, magnesium fluoride, and magnesium oxide.

6. The infrared imaging optical system of claim 1, wherein the intermediate lens group comprises an intermediate lens having a refractive index of from about 1.35 to about 1.7.

7. The infrared imaging optical system of claim 1, wherein the front lens has a refractive index of from about 2.2 to about 2.6.

8. The infrared imaging optical system of claim 1, wherein the rear lens has a refractive index of from about 2.2 to about 2.6.

9. The infrared imaging optical system of claim 1, wherein the detector is operable in a 3–5 micrometer wavelength range.

10. The infrared imaging optical system of claim 1, further including
a cold shield around the detector and having an opening therein at the pupil.

11. An infrared imaging optical system comprising:
a front lens group having negative optical power, wherein the front lens group comprises a front lens that is not made of silicon and is not made of germanium;
an intermediate lens group that receives an infrared light beam from the front lens group, wherein the intermediate lens group comprises an intermediate lens;

a rear lens group having positive optical power, wherein the rear lens group receives the infrared light beam from the intermediate lens group, wherein the rear lens group comprises a rear lens, and wherein at least two of the front lens, the intermediate lens, and the rear lens have at least one aspheric surface thereon; and an infrared detector that receives the infrared light beam from the rear lens group, wherein the imaging optical system has a pupil located between the rear lens group and the detector.

12. The infrared imaging optical system of claim 11, wherein the front lens has a refractive index of from about 2.0 to about 3.0.

13. The infrared imaging optical system of claim 11, wherein the intermediate lens has a refractive index of from about 1.35 to about 2.0.

14. The infrared imaging optical system of claim 11, wherein the rear lens has a refractive index of from about 2.0 to about 3.0.

15. The infrared imaging optical system of claim 11, wherein the detector is operable in a 2–7 micrometer wavelength range.

16. The infrared imaging optical system of claim 11, further including
a cold shield around the detector and having an opening therein at the pupil.

17. An infrared imaging optical system comprising:
a front lens group having negative optical power, wherein the front lens group comprises a front lens having a refractive index of from about 2.2 to about 2.6;
an intermediate lens group that receives an infrared light beam from the front lens group, wherein the intermediate lens group comprises an intermediate lens having a refractive index of from about 1.35 to about 1.7;
a rear lens group having positive optical power that receives the infrared light beam from the intermediate lens group, wherein the rear lens group comprises a rear lens having a refractive index of from about 2.2 to about 2.6, and wherein at least two of the front lens, the intermediate lens, and the rear lens have at least one aspheric surface thereon; and
an infrared detector that receives the infrared light beam from the rear lens group, wherein the imaging optical system has a pupil located between the rear lens group and the detector.

18. The infrared imaging optical system of claim 17, wherein the lenses with a refractive index of from about 2.2 to about 2.6 are made of a material selected from the group consisting of zinc sulfide, zinc selenide, arsenic trisulfide, and amtir1.

19. The infrared imaging optical system of claim 17, wherein the lenses with a refractive index of from about 1.35 to about 2.0 are made of a material selected from the group consisting of sapphire, spinel, barium fluoride, calcium fluoride, magnesium fluoride, and magnesium oxide.

20. The infrared imaging optical system of claim 17, wherein the detector is operable in a 2–7 micrometer wavelength range.

21. The infrared imaging optical system of claim 17, further including
a cold shield around the detector and having an opening therein at the pupil.

* * * * *